United States Patent [19]

Sendik et al.

(10) Patent No.: US 11,445,127 B2
(45) Date of Patent: Sep. 13, 2022

(54) LEVERAGING HDR SENSORS FOR HANDLING MIXED ILLUMINATION AUTO WHITE BALANCE

(71) Applicant: SAMSUNG ELECTRONICS CO., LTD., Suwon-si (KR)

(72) Inventors: Omry Sendik, Tel Aviv (IL); Roee Sfaradi, Nes Ziona (IL); Doron Sabo, Petah-Tikvah (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 16/901,152

(22) Filed: Jun. 15, 2020

(65) Prior Publication Data

US 2021/0392274 A1    Dec. 16, 2021

(51) Int. Cl.
*H04N 5/243* (2006.01)
*H04N 5/235* (2006.01)
*G06T 7/10* (2017.01)
*G06T 7/90* (2017.01)

(52) U.S. Cl.
CPC .............. *H04N 5/243* (2013.01); *G06T 7/10* (2017.01); *G06T 7/90* (2017.01); *H04N 5/2351* (2013.01); *H04N 5/2353* (2013.01); *G06T 2207/10024* (2013.01)

(58) Field of Classification Search
CPC .... H04N 5/243; H04N 5/2351; H04N 5/2353; G06T 7/10; G06T 7/90; G06T 2207/10024
See application file for complete search history.

(56) References Cited

U.S. PATENT DOCUMENTS

| 8,947,555 | B2 | 2/2015 | Velarde et al. |
| 9,443,284 | B1 | 9/2016 | Wang et al. |
| 9,749,546 | B2 | 8/2017 | Matsunaga |
| 10,194,091 | B2 * | 1/2019 | Nashizawa .......... H04N 5/2351 |

OTHER PUBLICATIONS

Hordley, "Scene Illuminant Estimation: Past, Present and Future", Color Research & Application, 2006, 33 pages.

* cited by examiner

*Primary Examiner* — Twyler L Haskins
*Assistant Examiner* — Angel L Garces-Rivera
(74) *Attorney, Agent, or Firm* — F. Chau & Associates, LLC (57) ABSTRACT

Systems and methods for setting the white balance of an image are described. Embodiments of the systems and methods may receive image data comprising a plurality of exposures, generate a plurality of white balance values based on merge information from a high dynamic range (HDR) merge of the exposures, and adjust a white balance of each pixel of the image data based on the white balance values.

16 Claims, 6 Drawing Sheets

LEVERAGING HDR SENSORS FOR HANDLING MIXED ILLUMINATION AUTO WHITE BALANCE

BACKGROUND

The following relates generally to image processing, and more specifically to setting the white balance of an image.

White balance refers to the process of altering the color cast of an image. For example, colors may be altered so that objects which appear white to the eye are rendered white in an image. The white balance of an image is related to the "color temperature" of a light source, which refers to the relative warmth or coolness of white light.

In some cases, digital cameras can have difficulty performing automatic white balancing. If the image is not properly white balanced, it can create unsightly blue, orange, or even green color casts. The problem can be exacerbated if a scene is illuminated with multiple different light sources such as a natural light source and one or more artificial light sources. That is, one object of an auto white balance algorithm is to find the color temperature of the ambient illumination. When a scene has more than one light source, each object may be affected by different illumination (or by a mixture of multiple illuminations), which can interfere with the auto white balance algorithm. Therefore, there is a need in the art for improved systems and methods for performing white balance on a digital image.

SUMMARY

A method, apparatus, non-transitory computer readable medium, and system for setting the white balance of an image are described. Embodiments of the method, apparatus, non-transitory computer readable medium, and system may receive image data comprising a plurality of exposures, generate a plurality of white balance values based on merge information from a high dynamic range (HDR) merge of the exposures, and adjust a white balance of each pixel of the image data based on the white balance values.

DETAILED DESCRIPTION

The present disclosure relates to performing white balancing on digital images. According to the present disclosure, an auto-white balance algorithm may apply different white balance values to different pixels in an image, rather than estimate a single global ambient illumination and apply the same solution to all pixels. Embodiments of the present disclosure use properties of High Dynamic Range (HDR) components to adjust image scenes with mixed illumination light.

White balance refers to the ratio of colors an image. During the process of white balancing, colors may be altered so that objects which appear white to the eye are rendered white in an image. The white balance of an image is related to the "color temperature" of a light source, which refers to the relative warmth or coolness of white light.

Embodiments of the present disclosure use information generated during an HDR merge. The HDR process may include segmentation of an image based on multiple illuminators, providing the ability to manage different brightness levels in the same image at once. For example, multiple image exposures may be merged, where each exposure captures details in parts of an image that are illuminated by different light sources. The output of the HDR merge process may also be used to find white and gray balance gains for proper managing of mixed illumination scenarios.

Although different brightness levels may be due to different illumination sources, the HDR process may identify different light sources directly. That is, the HDR process may be based on brightness levels alone. The HDR process may compute output pixels value as a linear combination of the pixel values of the same pixel in the different exposures. In many cases, for a given pixel, one of the exposures is dominant and therefore assigned higher weight.

Therefore, long exposure may capture details for shaded or dark parts of an image while short exposure may capture bright parts.

In natural images there is often a correlation between the brightness level and the illumination source (e.g. in the tunnel example, the tunnel exit is illuminated by the sun and is bright, while the tunnel interior is illuminated by the tunnel lamps and is dark). The correlation between brightness level and illumination source the HDR can provide useful segmentation information for white balancing.

The systems and methods of the present disclosure may be performed in real time. For example, multiple scene regions may be automatically divided into individual segments, and white balance gains may be estimated based on the segments. In some cases, a hardware accelerator may be used to speed up the performance of the HDR merge, the white balancing, or both.

A white balance (or color balance) may refer to the adjustment of the intensity of various colors in an image (typically red, green, and blue primary colors). This may enable the detection of colors in a way that seems more accurate to an average observer. In many cases, the colors will be balanced so that white objects appear white. For example, this may mean adjusting the RGB values of pixels depicting a white or gray object so that these values are equal. Hence, color balancing methods may be called gray balance, neutral balance, or white balance.

In some cases, color balancing or white balancing changes the overall mixture of colors in an image. Generalized versions of color balance may be used to correct colors other than neutrals, or to deliberately change colors for artistic effect.

Accordingly, image data acquired by sensors—either film or electronic image sensors—may be transformed from the acquired values to new values that are appropriate for color reproduction or display. Several aspects of the acquisition and display process make such color correction essential—including that the acquisition sensors do not match the sensors in the human eye, that the properties of the display medium may be accounted for, and that the ambient viewing conditions of the acquisition differ from the display viewing conditions.

Figure 1:
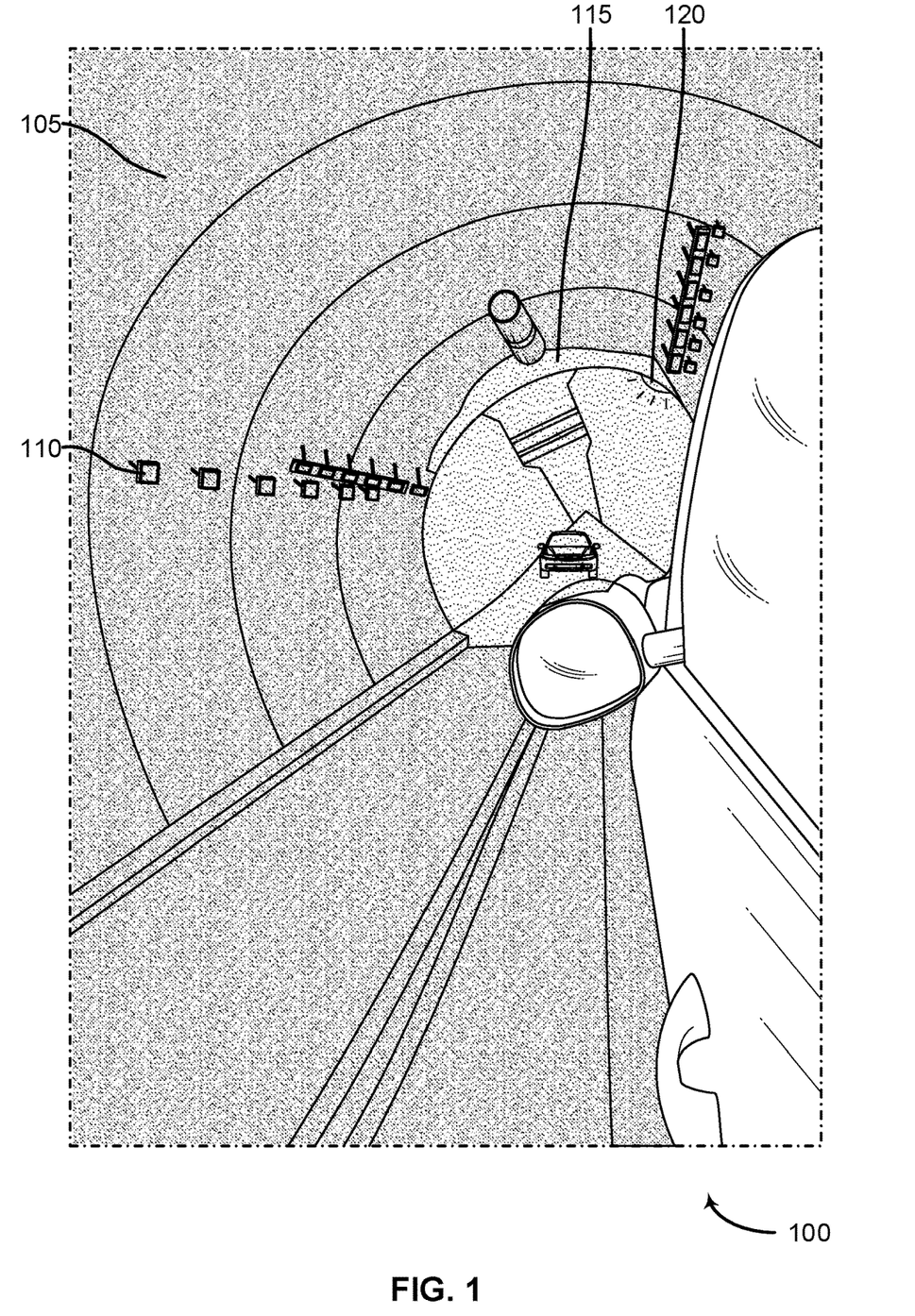
FIG. 1 shows an example of an image including multiple illumination sources according to aspects of the present disclosure.

FIG. 1 shows an example of an image 100 including multiple illumination sources according to aspects of the present disclosure. Image 100 may include first region 105 and second region 115. First region 105 may include first illumination source 110 (i.e., an artificial light source such as the electric lights within a tunnel), and second region 115 may include second illumination source 120 (i.e., a natural light source such as the sun).

A camera collects light data in an image capturing process, where the light data is reflected and refracted from surfaces of various objects in a scene. For example, the objects may be structured, natural, or artificial objects such as buildings, cars, people, animals, and the like. Additionally, objects may be amorphous subjects such as sky, grass, and oceans, but the present disclosure is not limited to these examples.

The apparent color of captured objects in an image may depend on the original colors of the objects and the illumination conditions of the scene. That is, the light absorption and emission spectra of objects may determine the perceived color together with the illumination conditions and the structure of the Human Visual System (HVS).

For example, an image of a scene in daylight illumination conditions may appear different compared to the same scene during sunset or dawn. The difference in temperature of illuminants causes this difference. Colder color temperatures may be visible in the middle of the day, and warmer color temperatures may be visible during sunset.

The color temperature of a light source refers to the temperature of an ideal black-body radiator that radiates light of that color. Thus, color temperature is meaningful for light sources that correspond closely to the radiation of a particular black body. This may include light in the range from red to orange to yellow to white to blueish white. Color temperature may not apply to green or a purple light. Color temperature is conventionally expressed in kelvins, using the symbol K, a unit of measure for absolute temperature. For example, color temperatures over 5000 K are sometimes referred to as "cool colors" (bluish), while lower color temperatures (2700-3000 K) may be referred to as "warm colors" (yellowish).

Embodiments of the present disclosure use high dynamic range sensors to apply white balancing processes in scenes that contain two or more types of illuminators. As discussed above, the illuminators may be contradictory, applying different levels of light to the same scene. Such scenarios are common in automotive scenarios like the tunnel depicted in FIG. 1.

For example, when a vehicle is entering or exiting a tunnel, the scene is often illuminated by two sources. The first source may be the artificial tunnel lighting, and the second source may be the sun or moon. These sources may have vastly different color temperature and lighting characteristics. If a single set of white balance gains is applied to the entirety of the scene, the chosen white balance may be unsuitable for regions primarily illuminated by one (or both) of these different sources.

Thus, first illumination source 110 and second illumination source 120 may have vastly different characteristics such as different brightness levels and different color temperatures. The light reflected from these sources (i.e., in first region 105 and second region 115) may also be different. If the same white balancing is used for both regions, the result may appear unnatural. For example, the first region 105, which is illuminated by the artificial light, might appear to have a yellow cast, and the second region 115, which is illuminated by the natural light, might appear to have a blue cast. If white balancing is done separately for these different regions, the result might appear more natural.

Figure 2:
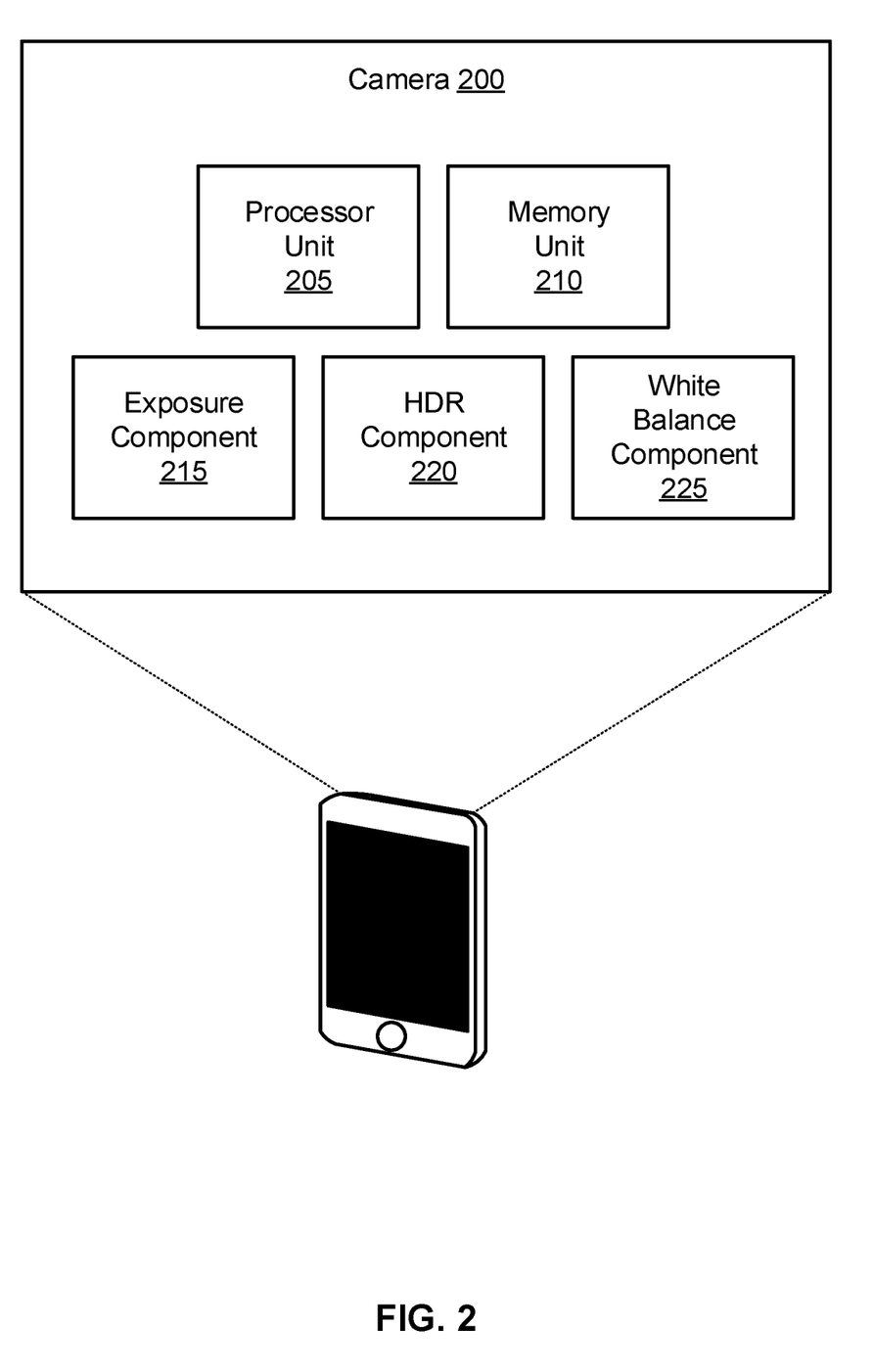
FIG. 2 shows an example of a camera according to aspects of the present disclosure.

FIG. 2 shows an example of a camera 200 according to aspects of the present disclosure. Camera 200 may include processor unit 205, memory unit 210, exposure component 215, high dynamic range (HDR) component 220, and white balance component 225. In some cases, the camera 200 may be a part of another device such as a mobile electronic device or even a large device such as a vehicle. However, the present disclosure is not limited to such devices. For example, in some cases, image data may be received from remote sensors and processed on the cloud.

A processor unit 205 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A memory unit 210 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Exposure component 215 may receive image data including a set of exposures. For example, exposure component 215 may expose a camera sensor to light for a first length of time to produce a first exposure, and then expose the camera sensor (or a different camera sensor) to the light for a second length of time, different from the first length of time, to produce a second exposure. In some cases, more than two exposures are collected. In some examples the image data is based on a set of illumination sources.

HDR component 220 may perform an HDR merge on the exposures. The HDR process is based on taking multiple exposures, which capture different light levels. The different exposures may capture a level of illumination appropriate for different parts of an image. Thus, in the HDR process, one of the exposures (or a combination of exposures) is chosen for each pixel. This essentially divides an image into different regions (although they may overlap if a combination of exposures is used for each pixel). The HDR process uses this information to achieve an appropriate level of illumination in each region, but the information can also be used to achieve an appropriate white balance in each region because the different brightness of levels of different illumination sources may also be associated with different light sources, and therefore different color temperatures.

High-dynamic-range imaging may be used to reproduce a greater dynamic range of luminosity than what is possible with standard digital imaging or photographic techniques. For example, standard techniques may allow differentiation within a limited range of brightness. Outside of this range, features may not be sufficiently differentiated. For example, in excessively bright areas everything appears white, and in excessively dark areas everything appears black.

However, HDR images can record and represent a wider range of luminance. This may be accomplished by capturing and combining several different exposures of the same scene. HDR images may be generated using are computer processing, or by manually merging multiple images. HDR images can also be acquired using special image sensors.

Some methods of rendering an HDR image to a display device may be referred to as tone mapping. Tone mapping may reduce the overall contrast of an HDR image, but it may also enable more natural or detailed images to be displayed on a device.

White balance component 225 generates a set of white balance values based on merge information from the HDR merge of the exposures, and adjusts a white balance of each pixel of the image data based on the white balance values. White balance component 225 may also divide the image data into a set of illumination segments based on the HDR merge, where each of the white balance values corresponds to one of the illumination segments. In some cases, the illumination segments are the same as those used for the HDR merge, although the present disclosure is not limited thereto. For example, additional processing may be used to refine, limit, or other alter the segmentation information from the HDR process.

Thus, white balance component 225 may identify a set of white balance regions, where each pixel of the image data corresponds to one of the white balance regions, each of the white balance regions corresponds to one of the white balance values, and the white balance of each pixel is adjusted based on the corresponding white balance region.

In some cases, white balance component 225 may identify exposure information for each pixel of the image data based on the HDR merge, where the exposure information includes a correspondence between the pixel and one or more of the exposures, and where the image data is divided into the illumination segments based on the exposure information. In some examples, the exposure information indicates a single exposure for each of the pixels.

In some examples, the exposure information indicates a linear combination of the exposures for each of the pixels. Thus, white balance component 225 may identify a factor including a linear combination of the exposures for each of the pixels, and select an exposure having a highest weight for each of the pixels, and determine whether the highest weight for each of the pixels is above a threshold value, where the image data is divided into the illumination segments based on the determination. In some cases, the transition between segments can be continuous. That is, the white balance gain applied to a pixel can be a linear combination of white balance from two different segments in order to avoid discontinuities in the resulting image.

White balance component 225 determines the white balance for one or more regions of an image using various white balancing techniques. For example, in a gray world assumption (GWA) method, the white balance component 225 may identify an average RGB value for pixels in each of the illumination segments, and apply one or more gains to an RGB value for each of the pixels in each of the illumination segments based on the corresponding average RGB value, where the white balance of each pixel in the image data is adjusted based on the applied one or more gains.

Various methods for light color assessment may be used. The WA method may equalize the mean of the red, green, and blue channels. In situations where a certain color dominates, such as a blue hue for the sky or yellow due to a tunnel illuminator, it may be difficult to apply the GWA method without distorting colors.

Another method, known as the Retinex method of visual color constancy, is based on the principle that a perceived white color is associated with maximal color signals. Therefore, the Retinex method attempts to equalize the maximal color signals. However, the Retinex method may not be suitable in scenes where the maximal color signals are different compared to the illumination color.

Other illumination estimation methods estimate the illumination of a scene using correlation-based methods. However, these illumination estimation methods can computationally intensive and may not be applicable in real-time applications. According to embodiments of the present disclosure, one or more of these methods may be applied to different regions of an image segmented based information received from an HDR merge process.

Figure 3:
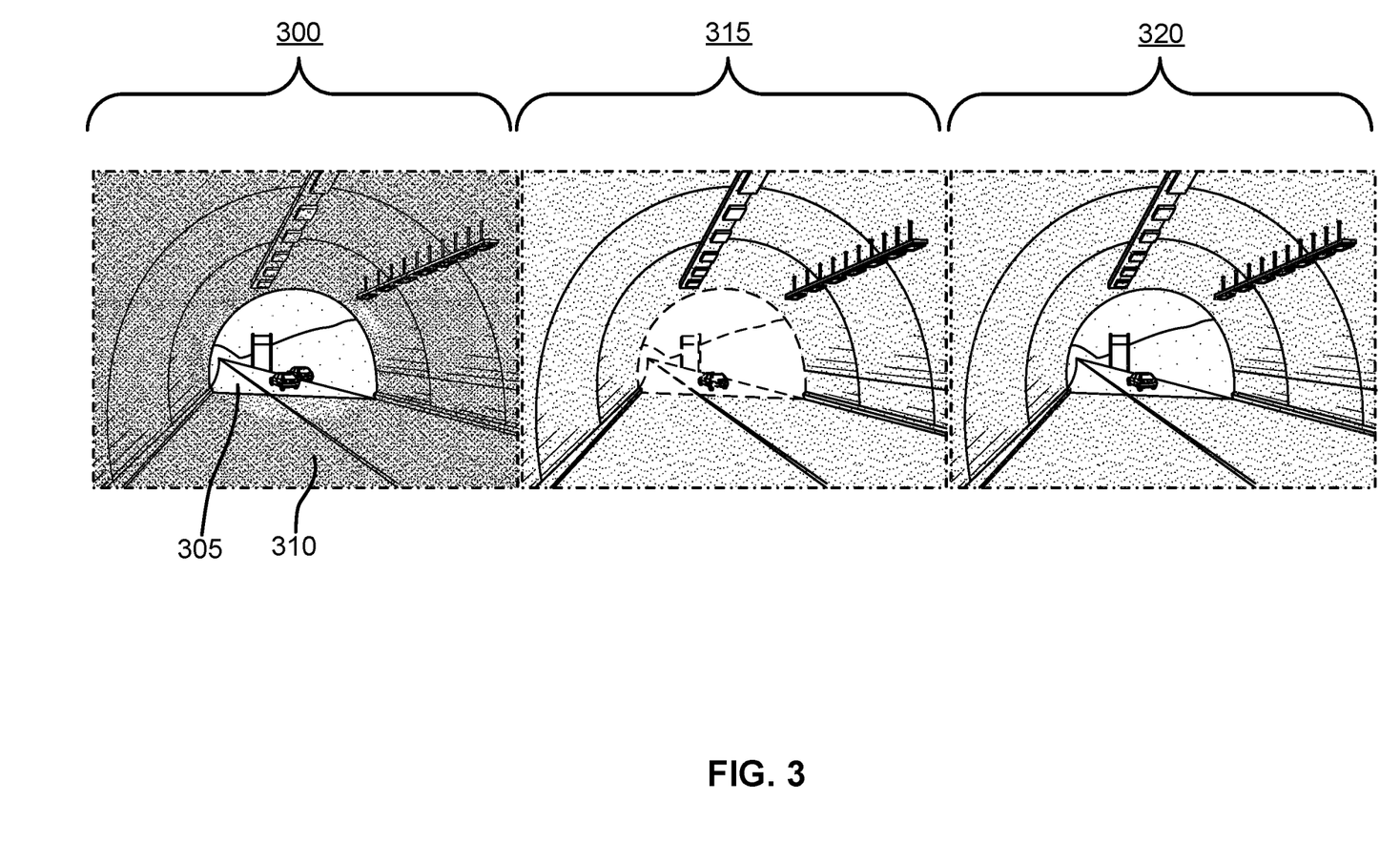
FIG. 3 shows an example of a high dynamic range (HDR) merge process according to aspects of the present disclosure.

FIG. 3 shows an example of an HDR merge process according to aspects of the present disclosure. The example shown includes first exposure 300, second exposure 315, and merged image 320. Information (such as image segmentation information) from the HDR merge process depicted in FIG. 3 may be subsequently used to perform white balancing on the different regions separately.

Thus, first exposure 300, second exposure 315, and merged image 320 may each depict a first region 305 (outside the tunnel, open to the natural light) and second region 310 (i.e., inside the tunnel, lit by artificial light), but the images for the different exposures may be exposed to light for a different duration of time.

First exposure 300 may correspond to an exposure with a relatively small exposure time. Thus, the first region 305 may appear to have an appropriate level of lighting but the second region 310 is quite dark. For this reason, it may be difficult to pick out the details of the second region 310. Therefore, a second exposure 315 is taken with a longer exposure time. In the second exposure 315, the second region 310 may have an appropriate level of lighting, but the first region 305 may be washed out due to overexposure. Therefore, it may be hard to make out detail from the first region 305.

During the HDR merge process, each pixel may be assigned to either the first region 305, the second region 310, or a combination of regions. If a pixel is assigned to the first region 305, merged image 320 may depict the pixel using image data from the first exposure 300. Similarly, if a pixel is assigned to the second region 310, merged image 320 may use image data from the second exposure 315.

Thus, image sensors may provide multiple final frames composed of separate exposures. For example, a final frame may be composed of 2 or more separate exposures. Each frame is captured with different integration times. The exposures attempt to capture a high dynamic range scene. Using the separate exposures before combining the images provides a segmentation into regions that are illuminated by different illumination sources.

In an example scenario, the present disclosure may provide multiple images where one image may contain highlight information, and another may contain lowlight information. The images may be combined into a merged HDR frame with characteristics of both highlights and lowlights. The present disclosure can differentiate between pixels based on different types of white balancing.

Systems and methods of the present disclosure may take an input image and determines segmentation based on image exposure. A segmentation map is then created. A white balancing problem is solved for each segment of the image. The white balance gains are then output. In the resulting digital image, the colors may appear more properly balanced (i.e., white objects appear white).

Figure 4:
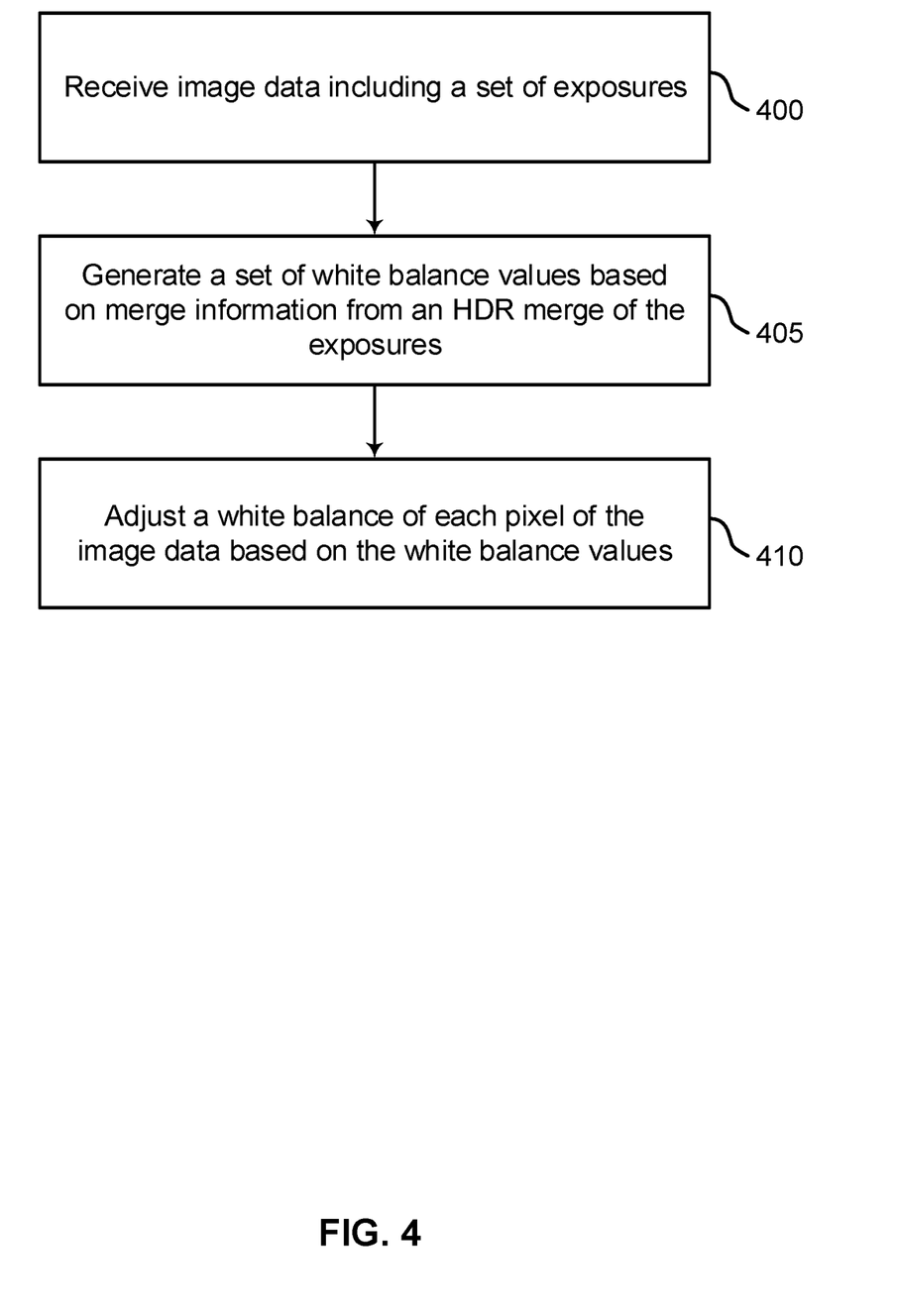
FIG. 4 shows an example of a method of image processing according to aspects of the present disclosure.

FIG. 4 shows an example of a method of image processing according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 400, the system receives image data including a set of exposures. In some cases, the operations of this step may refer to, or be performed by, an exposure component as described with reference to FIG. 2. The image data may be received from one or more camera sensors that generate the different exposure by collecting light for different periods of time.

At operation 405, the system generates a set of white balance values based on merge information from an HDR merge of the exposures. In some cases, the operations of this step may refer to, or be performed by, a white balance component as described with reference to FIG. 2. For example, the merge information may include information regarding which exposure (or combination of exposures) is selected for each pixel during the HDR merge.

At operation 410, the system adjusts a white balance of each pixel of the image data based on the white balance values. In some cases, the operations of this step may refer to, or be performed by, a white balance component as described with reference to FIG. 2. For example, a different white balance may be used for each of a plurality of segments of an image determined based on the HDR merge. This may provide more appropriate white balancing for each segment, and may also make the white balancing more consistent with the HDR merge.

Figure 5:
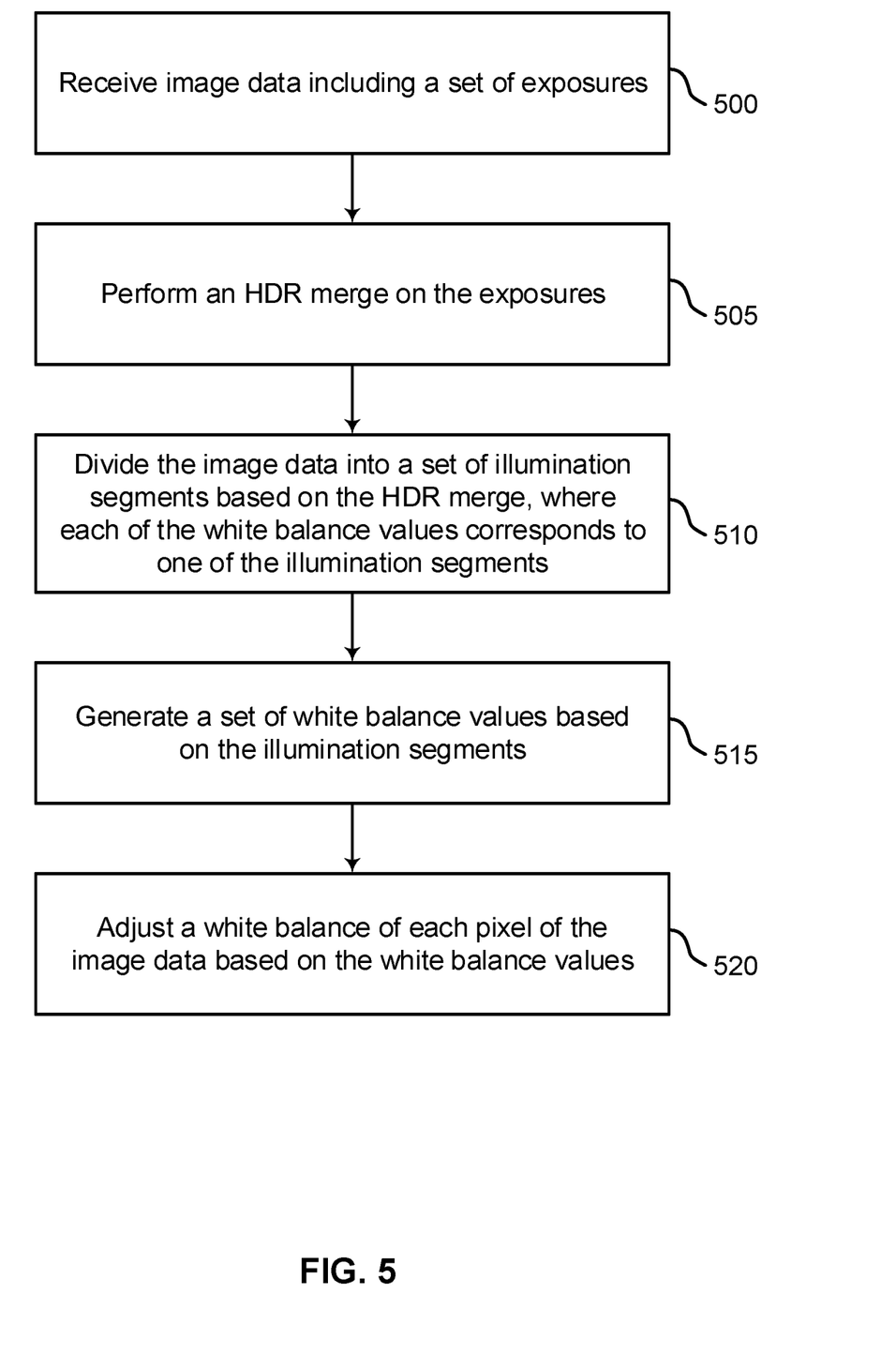
FIG. 5 shows an example of a process for setting the white balance of an image based on an HDR merge according to aspects of the present disclosure.

FIG. 5 shows an example of a process for setting the white balance of an image based on an HDR merge according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 500, the system receives image data including a set of exposures. In some cases, the operations of this step may refer to, or be performed by, an exposure component as described with reference to FIG. 2.

At operation 505, the system performs an HDR merge on the exposures. In some cases, the operations of this step may refer to, or be performed by, an HDR component as described with reference to FIG. 2. For example the HDR component may select a different exposure (or combination of exposures) for each pixel of an image.

At operation 510, the system divides the image data into a set of illumination segments based on the HDR merge, where each of the white balance values corresponds to one of the illumination segments. In some cases, the operations of this step may refer to, or be performed by, a white balance component as described with reference to FIG. 2. In some cases, the illumination segments may be the same as segments used for the HDR merge. However, in other cases, the segments may overlap, or only a subset of pixels may be used if some pixels are associated with more than one exposure. For example, each segment may be selected if a value for a given exposure (i.e., from the HDR merge) is above a threshold value.

At operation 515, the system generates a set of white balance values based on the illumination segments. In some cases, the operations of this step may refer to, or be performed by, a white balance component as described with reference to FIG. 2. The white values may be generated using any suitable white balancing algorithm, such as finding average RGB values within a segment and then identifying a gain for each color based on the average RGB value.

At operation 520, the system adjusts a white balance of each pixel of the image data based on the white balance values. In some cases, the operations of this step may refer to, or be performed by, a white balance component as described with reference to FIG. 2. In some cases, the segments where each white balance value is applied may not be equivalent to the segments that are used to determine each white balance value. For example, in some cases only a subset of pixels are used to determine the white balancing values, but the white value may be adjusted for each pixel in the image data.

Figure 6:
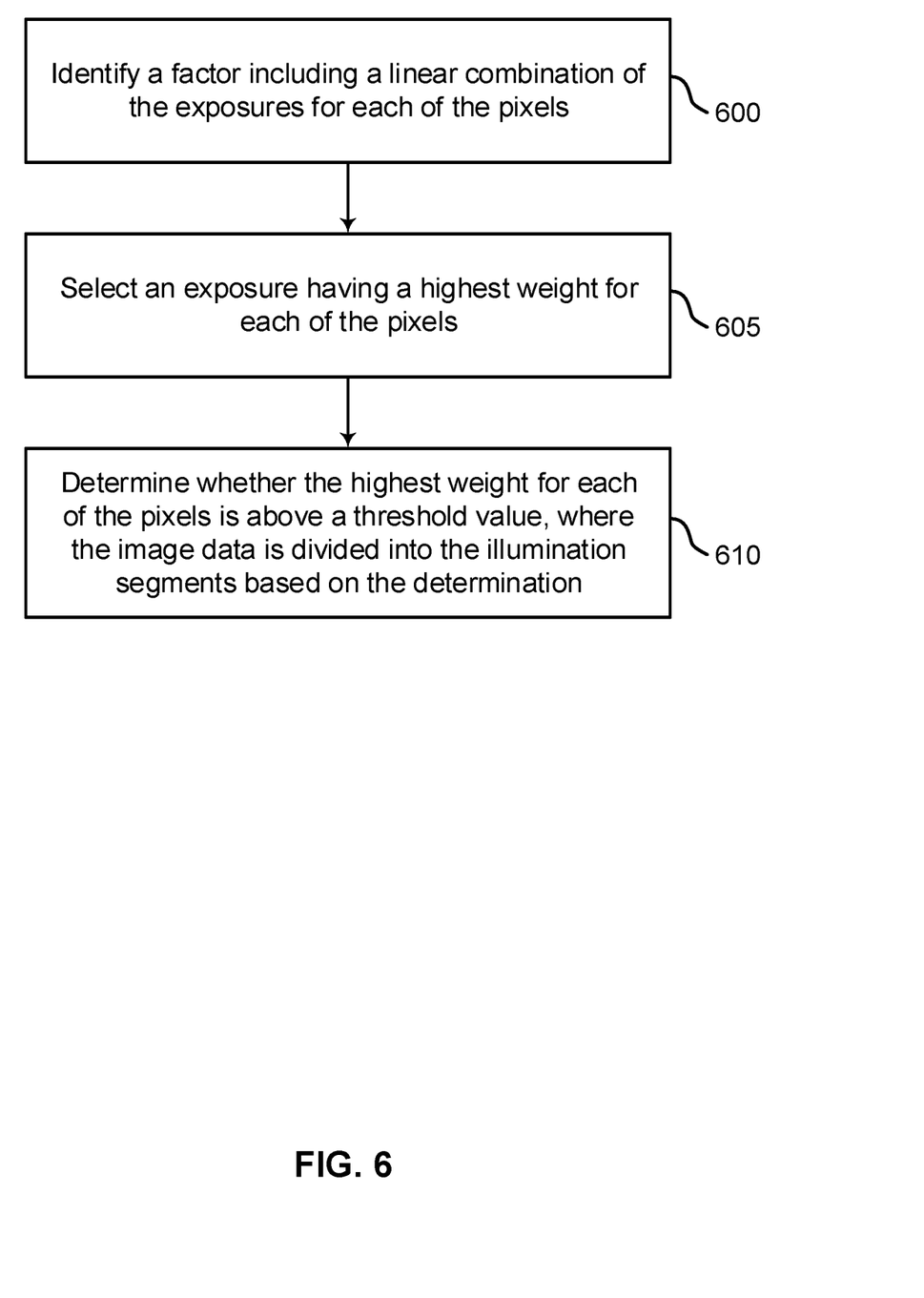
FIG. 6 shows an example of a process for setting the white balance of an image according to aspects of the present disclosure.

FIG. 6 shows an example of a process for setting the white balance of an image according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 600, the system identifies a factor including a linear combination of the exposures for each of the pixels. In some cases, the operations of this step may refer to, or be performed by, a white balance component as described with reference to FIG. 2. For example, the linear combination of exposures may be a product of an HDR process.

At operation 605, the system selects an exposure having a highest weight for each of the pixels. In some cases, the operations of this step may refer to, or be performed by, a white balance component as described with reference to FIG. 2. In some cases, each pixel is included in a segment because each pixel may have a highest value. However, in some cases, not all pixels are used for identifying a baseline white balance for each region.

At operation 610, the system determines whether the highest weight for each of the pixels is above a threshold value, where the image data is divided into the illumination segments based on the determination. In some cases, the operations of this step may refer to, or be performed by, a white balance component as described with reference to FIG. 2.

Accordingly, the present disclosure includes the following embodiments.

A method for setting the white balance of an image is described. Embodiments of the method may include receiving image data comprising a plurality of exposures, generating a plurality of white balance values based on merge information from a high dynamic range (HDR) merge of the exposures, and adjusting a white balance of each pixel of the image data based on the white balance values.

An apparatus for image processing is described. The apparatus may include a processor, memory in electronic communication with the processor, and instructions stored in the memory. The instructions may be operable to cause the processor to receive image data comprising a plurality of exposures, generate a plurality of white balance values based on merge information from an HDR merge of the exposures, and adjust a white balance of each pixel of the image data based on the white balance values.

A non-transitory computer readable medium storing code for image processing is described. In some examples, the code comprises instructions executable by a processor to: receive image data comprising a plurality of exposures, generate a plurality of white balance values based on merge information from an HDR merge of the exposures, and adjust a white balance of each pixel of the image data based on the white balance values.

Some examples of the method, apparatus, non-transitory computer readable medium, and system described above may further include performing the HDR merge on the exposures. Some examples may further include dividing the image data into a plurality of illumination segments based on the HDR merge, wherein each of the white balance values corresponds to one of the illumination segments. Some examples of the method, apparatus, non-transitory computer readable medium, and system described above may further include exposing a camera sensor to light for a first length of time to produce a first exposure. Some examples may further include exposing the camera sensor to the light for a second length of time different from the first length of time to produce a second exposure, wherein the exposures include at least the first exposure and the second exposure.

Some examples of the method, apparatus, non-transitory computer readable medium, and system described above may further include identifying exposure information for each pixel of the image data based on the HDR merge, wherein the exposure information comprises a correspondence between the pixel and one or more of the exposures, and wherein the image data is divided into the illumination segments based on the exposure information. In some examples, the exposure information indicates a single exposure for each of the pixels. In some examples, the exposure information indicates a linear combination of the exposures for each of the pixels.

Some examples of the method, apparatus, non-transitory computer readable medium, and system described above may further include identifying a factor comprising a linear combination of the exposures for each of the pixels. Some examples may further include selecting an exposure having a highest weight for each of the pixels. Some examples may further include determining whether the highest weight for each of the pixels is above a threshold value, wherein the image data is divided into the illumination segments based on the determination.

Some examples of the method, apparatus, non-transitory computer readable medium, and system described above may further include identifying an average Red/Green/Blue (RGB) value for pixels in each of the illumination segments. Some examples may further include applying one or more gains to an RGB value for each of the pixels in each of the illumination segments based on the corresponding average RGB value, wherein the white balance of each pixel in the image data is adjusted based on the applied one or more gains.

Some examples of the method, apparatus, non-transitory computer readable medium, and system described above may further include identifying a plurality of white balance regions, wherein each pixel of the image data corresponds to one of the white balance regions, each of the white balance regions corresponds to one of the white balance values, and the white balance of each pixel is adjusted based on the corresponding white balance region. In some examples, the image data is based on a plurality of illumination sources, and each of the illumination segments corresponds to one or more of the illumination sources.

Thus, the systems and methods of the present disclosure enable robust automatic white balance of an image in certain lighting conditions. This method is robust and can be implemented in hardware with other methods, producing a costly solution, due to the complexity of segmentation algorithms. The systems and methods of the present disclosure may also be combined with other methods (i.e., HDR methods, or white balance methods) to obtain more robust and reliable white balance gains.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
receiving image data comprising a plurality of exposures;
identifying exposure information for each pixel of the image data based on a high dynamic range (HDR) merge of the exposures,
wherein the exposure information comprises a correspondence between the pixel and one or more of the exposures, and
wherein the image data is divided into illumination segments based on the exposure information;
identifying a plurality of white balance regions; and
generating a plurality of white balance values based on the exposure information;
adjusting a white balance of each pixel of the image data based on the white balance values,
wherein each pixel of the image data corresponds to one of the white balance regions, each of the white balance regions corresponds to one of the white balance values, and the white balance of each pixel is adjusted based on the corresponding white balance region or a combination of corresponding white balance regions.

2. The method of claim 1, further comprising:
performing the HDR merge on the exposures; and
dividing the image data into the illumination segments based on the HDR merge, wherein each of the white balance values corresponds to one of the illumination segments.

3. The method of claim 1, further comprising:
exposing a camera sensor to light for a first length of time to produce a first exposure; and
exposing the camera sensor to the light for a second length of time different from the first length of time to produce a second exposure, wherein the exposures include at least the first exposure and the second exposure.

4. The method of claim 1, wherein:
the exposure information indicates a single exposure for each of the pixels.

5. The method of claim 1, wherein:
the exposure information indicates a linear combination of the exposures for each of the pixels.

6. The method of claim 1, further comprising:
identifying a factor comprising a linear combination of the exposures for each of the pixels;
selecting an exposure having a highest weight for each of the pixels; and
determining whether the highest weight for each of the pixels is above a threshold value, wherein the image data is divided into the illumination segments based on the determination.

7. The method of claim 1, further comprising:
identifying an average RGB value for pixels in each of the illumination segments; and
applying one or more gains to an RGB value for each of the pixels in each of the illumination segments based on the corresponding average RGB value, wherein the white balance of each pixel in the image data is adjusted based on the applied one or more gains.

8. The method of claim 1, wherein:
the image data is based on a plurality of illumination sources, and each of a plurality of illumination segments corresponds to one or more of the illumination sources.

9. The method of claim 1, wherein:
the plurality of exposures comprise more than two exposures.

10. An apparatus for image processing, comprising:
a camera;
a processor; and
a memory storing instructions and in electronic communication with the processor, the processor being configured to execute the instructions to:
receive image data comprising a plurality of exposures;
perform an HDR merge on the exposures;
divide the image data into a plurality of illumination segments based on the HDR merge;
generate a plurality of white balance values based on the plurality of illumination segments; and
identify an average RGB value for pixels in each of the illumination segments;
apply one or more gains to an RGB value for each of the pixels in each of the illumination segments based on the corresponding average RGB value;
adjust a white balance of each pixel of the image data based on the white balance values and based on the applied one or more gains.

11. The apparatus of claim 10, the processor being further configured to execute the instructions to:
identify a factor comprising a linear combination of the exposures for each of the pixels;
select an exposure having a highest weight for each of the pixels; and
determine whether the highest weight for each of the pixels is above a threshold value, wherein the image data is divided into the illumination segments based on the determination.

12. The apparatus of claim 10, the processor being further configured to execute the instructions to:
identify a plurality of white balance regions, wherein each pixel of the image data corresponds to one of the white balance regions, each of the white balance regions corresponds to one of the white balance values, and the white balance of each pixel is adjusted based on the corresponding white balance region.

13. A non-transitory computer readable medium storing code for image processing, the code comprising instructions executable by a processor to:

receive image data comprising a plurality of exposures;

generate a plurality of white balance values based on merge information from a high dynamic range (HDR) merge of the exposures;

identify a plurality of white balance regions, wherein each pixel of the image data corresponds to one of the white balance regions, and each of the white balance regions corresponds to one of the white balance values; and adjust a white balance of each pixel of the image data based on the white balance values and based on the corresponding white balance region.

14. The non-transitory computer readable medium of claim 13, the code further comprising instructions executable by the processor to:

perform the HDR merge on the exposures; and divide the image data into a plurality of illumination segments based on the HDR merge, wherein each of the white balance values corresponds to one of the illumination segments.

15. The non-transitory computer readable medium of claim 13, the code further comprising instructions executable by the processor to:

identify a factor comprising a linear combination of the exposures for each of the pixels;

select an exposure having a highest weight for each of the pixels; and determine whether the highest weight for each of the pixels is above a threshold value, wherein the image data is divided into the illumination segments based on the determination.

16. The non-transitory computer readable medium of claim 13, the code further comprising instructions executable by the processor to:

identify an average RGB value for pixels in each of the illumination segments; and apply one or more gains to an RGB value for each of the pixels in each of the illumination segments based on the corresponding average RGB value, wherein the white balance of each pixel in the image data is adjusted based on the applied one or more gains.

* * * * *